US 011548607B2

(12) United States Patent
McLaughlin et al.

(10) Patent No.: US 11,548,607 B2
(45) Date of Patent: Jan. 10, 2023

(54) LONGITUDINAL BEAM JOINT FOR A PRESSURE DECK ASSEMBLY

(71) Applicant: The Boeing Company, Chicago, IL (US)

(72) Inventors: Mark R. McLaughlin, Snohomish, WA (US); Steven D. Ingham, Everett, WA (US); Daniel J. Cox, Seattle, WA (US); Charles B. Lockin, Bothell, WA (US); Danilo Vukosav, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 16/716,379

(22) Filed: Dec. 16, 2019

(65) Prior Publication Data

US 2021/0179249 A1 Jun. 17, 2021

(51) Int. Cl.
*B64C 1/00* (2006.01)
*B64C 1/18* (2006.01)

(52) U.S. Cl.
CPC .................. *B64C 1/00* (2013.01); *B64C 1/18* (2013.01); *B64C 2001/009* (2013.01); *B64C 2001/0072* (2013.01)

(58) Field of Classification Search
CPC ........................ B64C 1/18; B64C 2001/0072
See application file for complete search history.

(56) References Cited

U.S. PATENT DOCUMENTS

| 8,544,794 | B2 | 10/2013 | Ciprian | |
|---|---|---|---|---|
| 8,567,150 | B2 | 10/2013 | Gauthie et al. | |
| 8,740,151 | B1 | 6/2014 | Rosman et al. | |
| 2009/0078826 | A1* | 3/2009 | Haensch | B64C 1/1461 244/129.5 |
| 2011/0290940 | A1* | 12/2011 | Noebel | B64C 1/10 244/121 |
| 2019/0308715 | A1 | 10/2019 | Church et al. | |

FOREIGN PATENT DOCUMENTS

| EP | 1351807 A1 | 10/2003 |
|---|---|---|
| GB | 2250039 A | 5/1992 |

OTHER PUBLICATIONS

European Search Report Received For Application No. 20203376.7 dated Apr. 12, 2021, 13 Pages.

* cited by examiner

*Primary Examiner* — Timothy D Collins
*Assistant Examiner* — Justin Michael Heston (57) ABSTRACT

A pressure deck assembly for a fuselage includes a longitudinal beam extending a length along a roll axis of the fuselage. The longitudinal beam includes a central member and opposing first and second flanges extending from the central member. The first flange includes a first upper side and a first lower side. The second flange includes a second upper side and a second lower side. The pressure deck assembly includes a pressure deck that includes first and second deck segments. The first deck segment is joined to the first flange of the longitudinal beam along the first lower side of the first flange. The second deck segment is joined to the second flange of the longitudinal beam along the second lower side of the second flange.

20 Claims, 7 Drawing Sheets

LONGITUDINAL BEAM JOINT FOR A PRESSURE DECK ASSEMBLY

TECHNICAL FIELD

The present disclosure relates generally to aircraft fuselages, and more particularly to pressure deck assemblies for aircraft fuselages.

BACKGROUND

The fuselage of some aircraft is constructed with a pressure deck assembly, which is sometimes referred to as a "pressure deck" or a "horizontal pressure deck". The pressure deck assembly forms a dividing structure that divides the height of the fuselage into different compartments, for example to support the floor of a compartment (e.g., a passenger compartment, a cargo compartment, etc.), to separate a pressurized compartment (e.g., a passenger compartment, a cargo compartment, etc.) from an unpressurized compartment (e.g., a wheel well, etc.), etc. Pressure deck assemblies sometimes include longitudinal beams that extend along the length of the fuselage.

The operating environment of some aircraft calls for the fuselage to include as many corrosion resistant components as possible. However, corrosion resistant metals such as titanium can be relatively heavy, for example as compared to corrosion resistant composite materials such as carbon fiber. Accordingly, it may be less desirable to fabricate the longitudinal beams of the pressure deck assembly from corrosion resistant metals. Moreover, while some corrosion resistant composite materials are lighter than many corrosion resistant metals, the inter-laminar tension (ILT) capabilities of some corrosion resistant composite materials may be insufficient to withstand the pressure loads exerted on the pressure deck assembly during operation of the aircraft.

SUMMARY

In one aspect, a pressure deck assembly is provided for a fuselage. The pressure deck assembly includes a longitudinal beam extending a length along a roll axis of the fuselage. The longitudinal beam includes a central member and opposing first and second flanges extending from the central member. The first flange includes a first upper side and a first lower side. The second flange includes a second upper side and a second lower side. The pressure deck assembly includes a pressure deck that includes first and second deck segments. The first deck segment is joined to the first flange of the longitudinal beam along the first lower side of the first flange. The second deck segment is joined to the second flange of the longitudinal beam along the second lower side of the second flange.

In another aspect, a pressure deck assembly is provided for a fuselage. The pressure deck assembly includes a longitudinal beam extending a length along a roll axis of the fuselage. The longitudinal beam includes a central member and opposing first and second flanges extending from the central member. The first flange forms a first corner of the longitudinal beam with central member. The second flange forms a second corner of the longitudinal beam with the central member. The pressure deck assembly includes a pressure deck that includes first and second deck segments. The first deck segment is joined to the first flange of the longitudinal beam such that the first deck segment extends on an outside of the first corner of the longitudinal beam. The second deck segment is joined to the second flange of the longitudinal beam such that the second deck segment extends on an outside of the second corner of the longitudinal beam.

In another aspect, a fuselage is provided for an aircraft. The fuselage includes a pressure deck assembly that includes a longitudinal beam extending a length along a roll axis of the fuselage. The longitudinal beam includes a central member and a flange extending from the central member. The flange includes an upper side and a lower side. The pressure deck assembly includes a pressure deck that includes a deck segment. The deck segment is joined to the flange of the longitudinal beam along the lower side of the flange.

DETAILED DESCRIPTION

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a pressure deck assembly for a fuselage. The pressure deck assembly includes a longitudinal beam extending a length along a roll axis of the fuselage. The longitudinal beam includes a central member and opposing first and second flanges extending from the central member. The first flange includes a first upper side and a first lower side. The second flange includes a second upper side and a second lower side. The pressure deck assembly includes a pressure deck that includes first and second deck segments. The first deck segment is joined to the first flange of the longitudinal beam along the first lower side of the first flange. The second deck segment is joined to the second flange of the longitudinal beam along the second lower side of the second flange.

Certain implementations of the present disclosure provide a pressure deck assembly for a fuselage. The pressure deck assembly includes a longitudinal beam extending a length along a roll axis of the fuselage. The longitudinal beam includes a central member and opposing first and second flanges extending from the central member. The first flange forms a first corner of the longitudinal beam with central member. The second flange forms a second corner of the longitudinal beam with the central member. The pressure deck assembly includes a pressure deck that includes first and second deck segments. The first deck segment is joined to the first flange of the longitudinal beam such that the first deck segment extends on an outside of the first corner of the longitudinal beam. The second deck segment is joined to the second flange of the longitudinal beam such that the second deck segment extends on an outside of the second corner of the longitudinal beam.

Certain implementations of the present disclosure enable longitudinal beams of a pressure deck assembly to be fabricated from composite materials. Certain implementations of the present disclosure reduce the weight of a pressure deck assembly of an aircraft fuselage. Certain implementations of the present disclosure increase the operational performance, efficiency, and/or capabilities of an aircraft.

Figure 1:
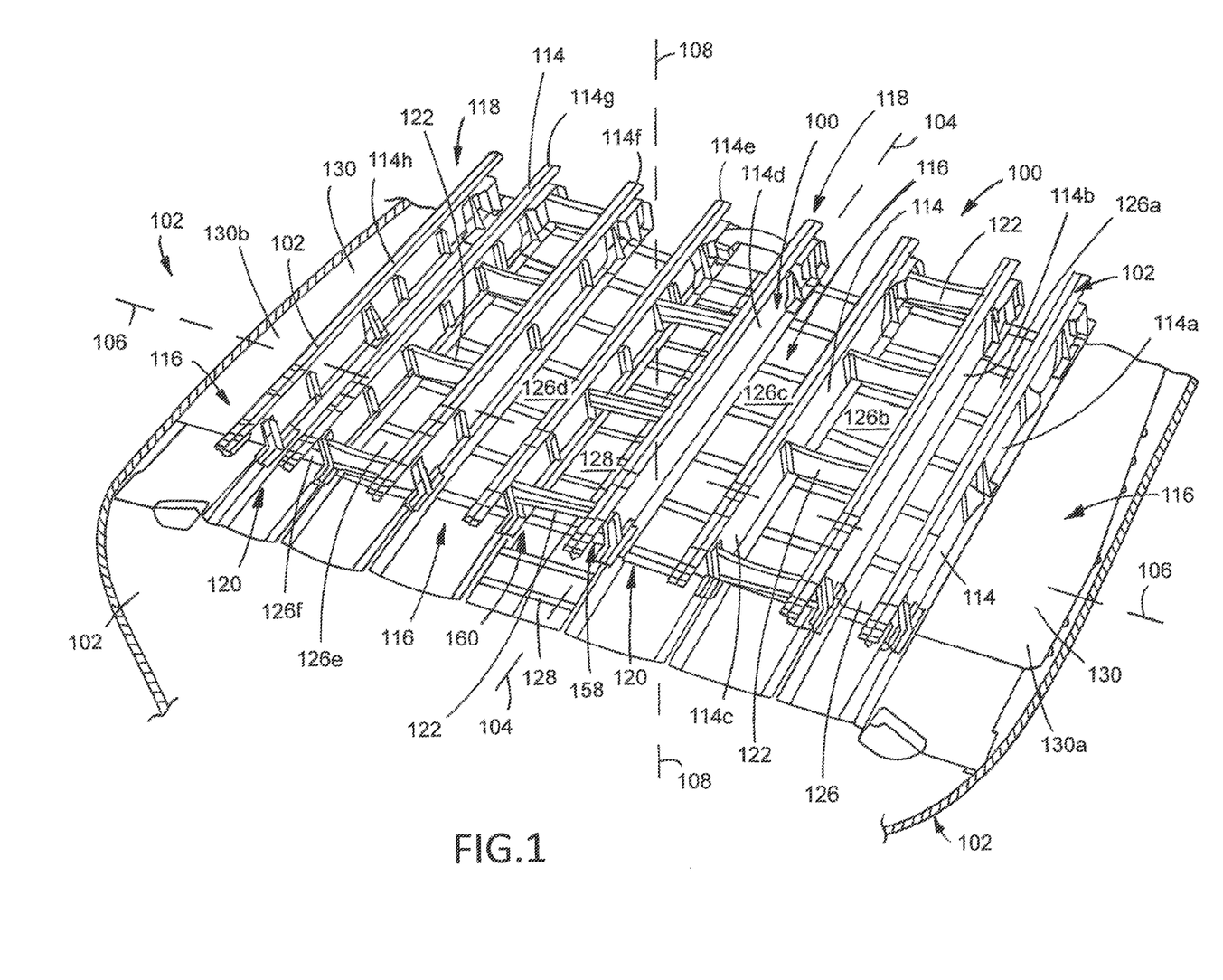
FIG. 1 is a perspective view illustrating a segment of a pressure deck assembly of a fuselage for an aircraft according to an implementation.

With references now to the figures, a perspective view of a segment of a pressure deck assembly 100 of a fuselage 102 for an aircraft (e.g., the aircraft 300 shown in FIG. 6, etc.) is provided in FIG. 1. The fuselage 100 extends a length (i.e., longitudinally) along a roll axis 104 of the fuselage 102 and aircraft. The fuselage 102 extends a width (e.g., laterally, horizontally, etc.) along a pitch axis 106 of the fuselage 102 and the aircraft. The fuselage 102 extends a height (e.g., vertically, etc.) along a yaw axis 108 of the fuselage 102 and the aircraft. As can be seen in FIG. 1, the roll axis 104, the pitch axes 106, and the yaw axis 108 extend perpendicular relative to each other. During flight of the aircraft, the fuselage 102 is configured to make roll, pitch, and yaw movements about the roll axis 104, the pitch axes 106, and the yaw 108, respectively. In the exemplary implementation, the fuselage 102 is a semi-monocoque fuselage, but the fuselage 102 is any other type of the fuselage 102 in other implementations.

The fuselage 102 includes the pressure deck assembly 100. As shown in FIG. 1, the pressure deck assembly 100 extends along the roll axis 104 of the fuselage 102. Specifically, the pressure deck assembly 100 extends a length along the roll axis 104. In other words, a length of the pressure deck assembly 100 extends longitudinally along a length of the fuselage 102. The width of the pressure deck assembly 100 extends laterally across the width of the fuselage 102 along the pitch axis 106.

The pressure deck assembly 100 forms a dividing structure that divides the height of the fuselage 102 into different compartments along at least a portion of the length of the fuselage 102. In some implementations, the pressure deck assembly 100 is a supporting structure that supports (or directly forms) the floor of a cargo compartment and/or a passenger compartment (e.g., an interior compartment 306 shown in FIG. 6, etc.) of the aircraft. In some implementations, the pressure deck assembly 100 separates a pressurized compartment (e.g., the interior compartment 306 shown in FIG. 6, etc.) from one or more unpressurized compartments of the fuselage 102, such as, but not limited to, a wheel well (e.g., the wheel well 320 shown in FIG. 6, etc.), and/or the like. In some implementations, the segment of the pressure deck assembly 100 defines a portion (one of two or more segments) of the length of the pressure deck assembly 100. In other implementations, the segment of the pressure deck assembly 100 defines an entirety of the length of the pressure deck assembly 100.

In the exemplary implementation, the length of the pressure deck assembly 100 extends approximately parallel to the roll axis 104 of the fuselage 102 and a width of the pressure deck assembly 100 extends approximately parallel to the pitch axis 106 such that the pressure deck assembly 100 extends approximately horizontal when the fuselage 102 is oriented upright (e.g., level with the horizon, etc.). In other implementations, at least a segment of the length of the pressure deck assembly 100 extends at a non-parallel angle (e.g., an acute angle, an obtuse angle, etc.) relative to the roll axis 104 of the fuselage 102 and/or at least a segment of the width of the pressure deck assembly 100 extends at non-parallel angle (e.g., an acute angle, an obtuse angle, etc.) relative to the pitch axis 106 of the fuselage 102. In some implementations, the pressure deck assembly 100 is a component of (e.g., forms a support structure of, forms a boundary of, extends within, etc.) one or more compartments of the fuselage 102, such as, but not limited to, a wheel well (e.g., the wheel well 320 shown in FIG. 6, etc.), and/or the like.

Figure 6:
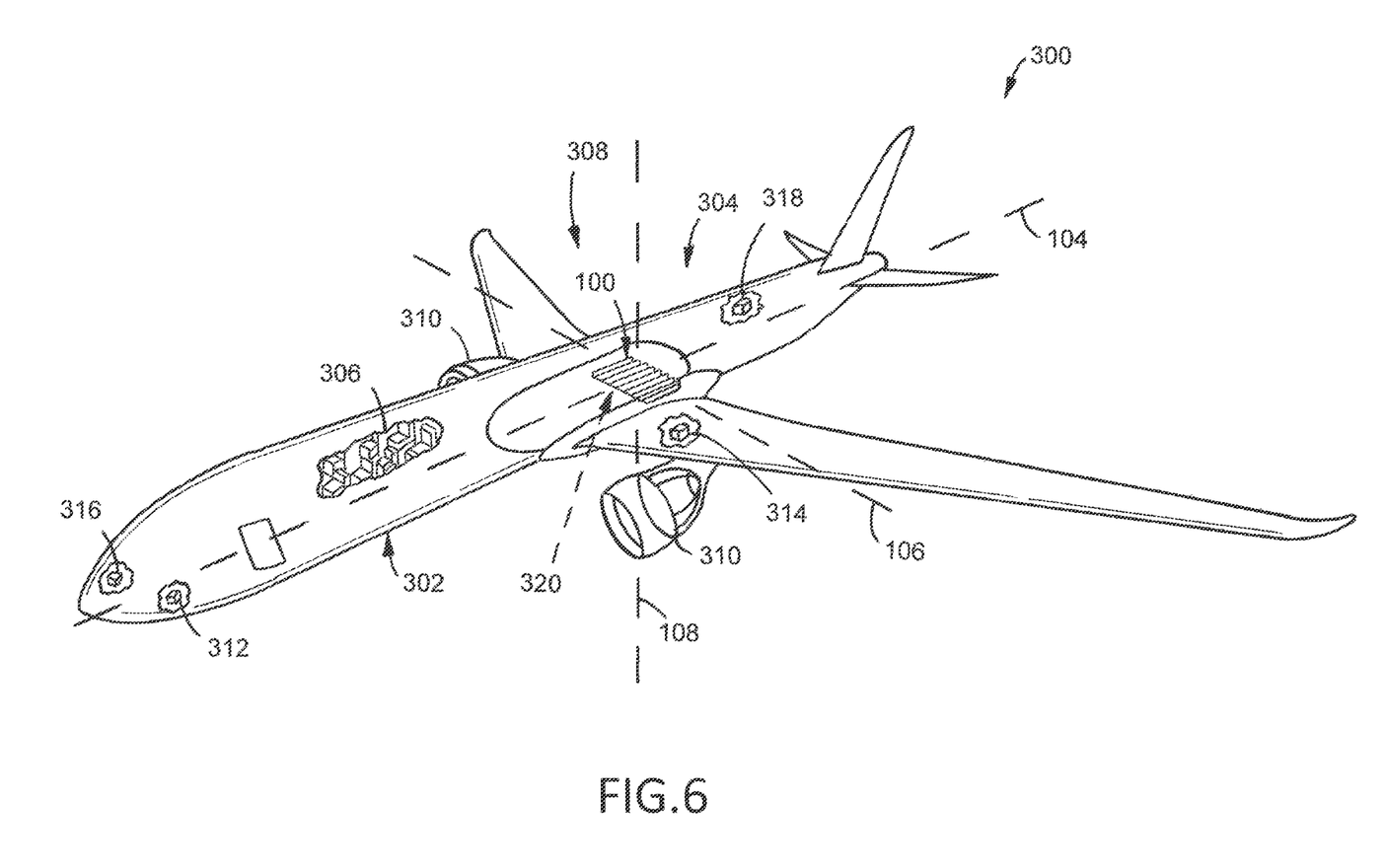
FIG. 6 is a schematic view of an implementation of an aircraft.

The pressure deck assembly 100 shown in FIG. 1 extends at any location along the length of the fuselage 102 (i.e., an any location along a length of the roll axis 104). FIG. 6 illustrates an example of the location of the pressure deck assembly 100 shown in FIG. 1 according to an exemplary implementation. Specifically, the pressure deck assembly 100 is a component of the wheel well 320 of a fuselage 302 (e.g., the pressure deck assembly 100 forms a support structure of the wheel well 320, the pressure deck assembly 100 forms a boundary of the wheel well 320, the pressure deck assembly 100 extends within the wheel well 320, etc.). But, additionally or alternatively the pressure deck assembly 100 has any other location along the length of the fuselage 302, whether such location is within a wheel well of the fuselage 302. For example, in other implementations, the pressure deck assembly 100 forms a support structure of another component, structure, and/or the like of the fuselage 302 in addition or alternatively to a wheel well.

Figure 2:
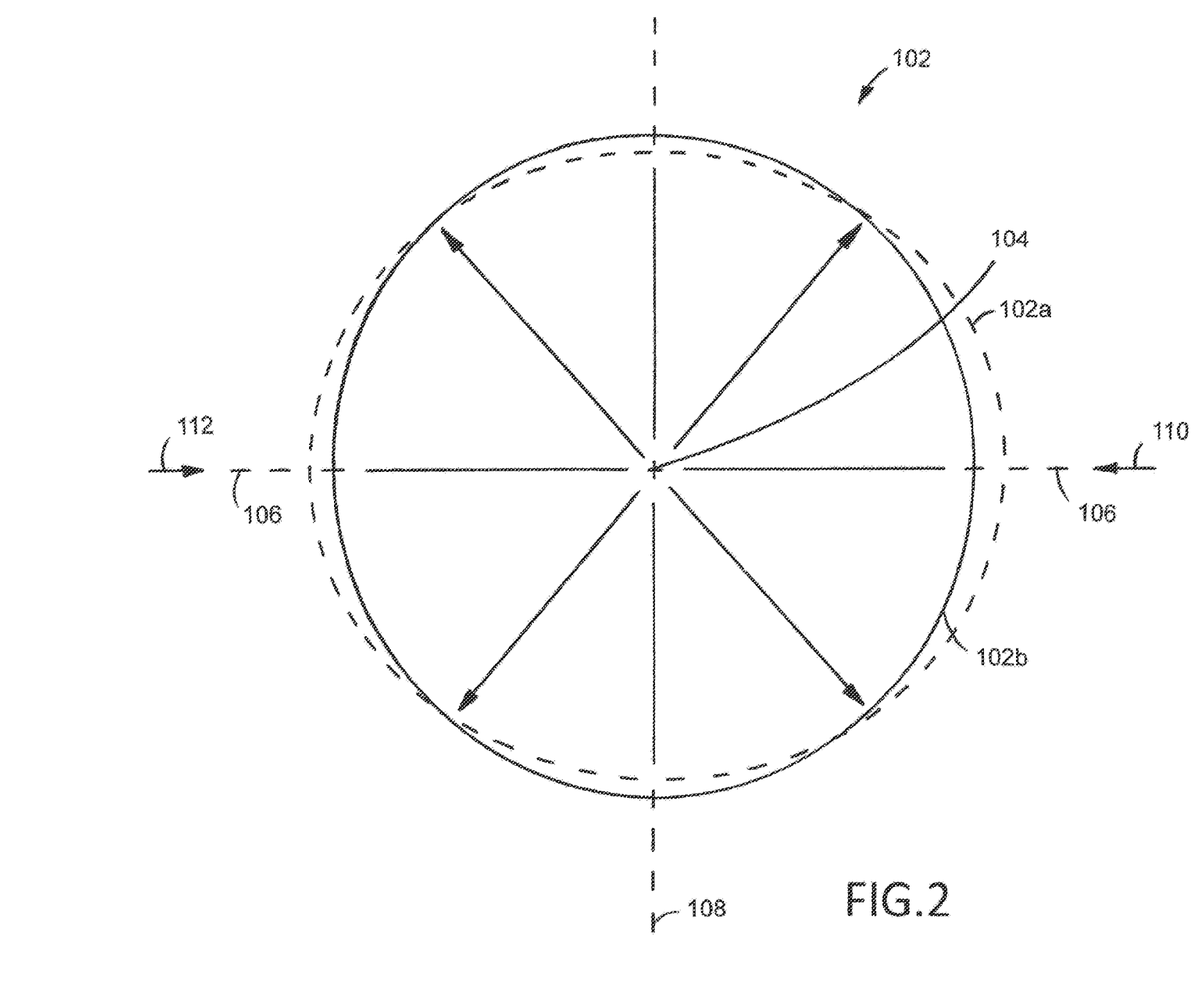
FIG. 2 is a cross-sectional view of the fuselage shown in FIG. 1 according to an implementation.

Referring now to FIG. 2, the exemplary implementation of the fuselage 102 includes a wider-than-tall elliptical cross-sectional shape at least at the location of the pressure deck assembly 100 (at least when the interior of the fuselage 102 is unpressurized). Specifically, the cross-sectional shape of the fuselage 102 at the pressure deck assembly 100 when an interior of the fuselage 102 is not pressurized is indicated in FIG. 2 with a dotted line, which is labeled with a reference numeral 102a. In other words, the dotted line 102a illustrates an unpressurized cross-sectional shape of the exemplary implementation of the fuselage 102 at the location of the pressure deck assembly 100. The cross-sectional shape of exemplary implementation of the fuselage 102 at the pressure deck assembly 100 when the interior of the fuselage 102 is pressurized is shown in FIG. 2 with a solid line 102b. In other words, the solid line 102b illustrates a pressurized cross-sectional shape of the exemplary implementation of the fuselage 102 at the location of the pressure deck assembly 100.

As can be seen in FIG. 2, the unpressurized cross-sectional shape represented by the dotted line 102a of the fuselage 102 is a wider-than-tall ellipse. Specifically, the unpressurized cross-sectional shape represented by the dotted line 102a of the fuselage 102 is an elliptical cross-sectional shape that is larger along the pitch axis 106 than along the yaw axis 108. As can be seen from a comparison of the dotted line 102a and the solid line 102b, the pressurized cross-sectional shape represented by the solid line 102b of the fuselage 102 is smaller along the pitch axis 106 and larger along the yaw axis 108 as compared to the unpressurized cross-sectional shape represented by the dotted line 102a of the fuselage 102. Accordingly, pressurization of the interior of the fuselage 102 exerts (e.g., increases, etc.) compression forces on the fuselage 102 in directions of arrows 110 and 112 that shrink the fuselage 102 along the pitch axis 106 and enlarge the fuselage 102 along the yaw axis 108.

The fuselage 102 is not limited to including a wider-than-tall elliptical cross-sectional shape at the location of the pressure deck assembly 100. Rather, in other implementations, the fuselage 102 includes an approximately circular cross-sectional shape at the location of the pressure deck assembly 100 when the fuselage 102 is unpressurized. In still other implementations, the fuselage 102 includes a taller-than-wide elliptical cross-sectional shape at the location of the pressure deck assembly 100 when the fuselage 102 is unpressurized.

Referring again to FIG. 1, the pressure deck assembly 100 includes a plurality of longitudinal beams 114 and a pressure deck 116. Each of the plurality of longitudinal beams 114 extend a length along the roll axis 104 of the fuselage 102 from an end portion 118 to an opposite end portion 120. In other words, lengths of each of the plurality of longitudinal beams 114 extend longitudinally along the length of the fuselage 102. In the exemplary implementation, the length of each of the plurality of longitudinal beam 114 extends approximately parallel to the roll axis 104 of the fuselage 102 and approximately perpendicular to each of the pitch axis 106 and the yaw axis 108. However, in other implementations, the length of one or more of the plurality of longitudinal beams 114 extends: (1) at a non-parallel angle (e.g., an acute angle, an obtuse angle, etc.) relative to the roll axis 104 of the fuselage 102; (2) at a non-perpendicular angle relative to the pitch axis 106; and/or (3) at a non-perpendicular angle relative to the yaw axis 108.

Optionally, the pressure deck assembly 100 includes one or more intercostals 122 that are joined between adjacent longitudinal beams of the plurality of longitudinal beams 114, for example to facilitate supporting the adjacent longitudinal beams of the plurality of longitudinal beams 114 in the orientation shown herein. Each of the plurality of longitudinal beams 114 includes (e.g., is fabricated from, consists of, etc.) any material(s) that enables each of the plurality of longitudinal beams 114 to function as described and/or illustrated herein. For example, the longitudinal beams 114 include (e.g., is fabricated from, consists of, etc.) a composite material in some implementations, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. In one example, one or more of the longitudinal beams 114 includes (e.g., is fabricated from, consists of, etc.) a thermoplastic carbon fiber composite material. In some other implementations, one or more of the longitudinal beams 114 includes (e.g., is fabricated from, consists of, etc.) another material in addition or alternative to a composite material, such as, but not limited to, titanium, aluminum, steel, an alloy of two or more metals, and/or the like. Although eight are shown in the exemplary implementation, the pressure deck assembly 100 includes any number of the longitudinal beams 114.

Figure 3:
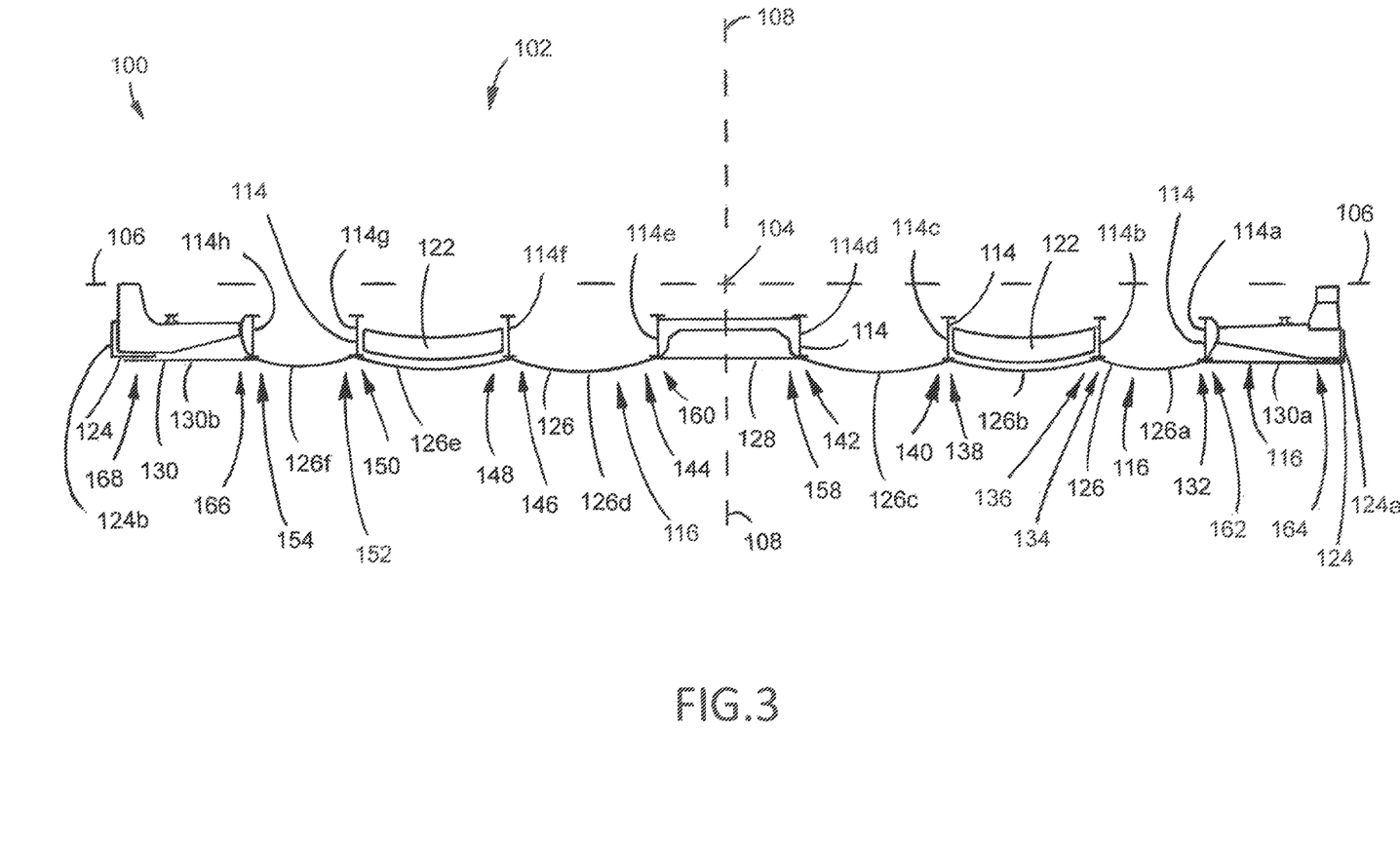
FIG. 3 is an elevational view of the pressure deck assembly segment shown in FIG. 1 according to an implementation.

Referring now to FIGS. 1 and 3, the pressure deck 116 extends between the plurality of longitudinal beams 114 along the lengths of the plurality of longitudinal beams 114. Specifically, along the lengths of the plurality of longitudinal beams 114, the pressure deck 116 extends laterally along the pitch axis 106 between each pair of adjacent longitudinal beams of the plurality of longitudinal beams 114. In the exemplary implementation, the pressure deck 116 is separated into a plurality of discrete (e.g., separate, individual, etc.) segments that each either extend between a corresponding pair of adjacent longitudinal beams 114 or extend between a corresponding longitudinal beam 114 and a corresponding longeron 124 (not shown in FIG. 1) of the fuselage 102.

For example, the exemplary implementation of the pressure deck 116 shown in FIGS. 1 and 3 includes a plurality of compliant deck segments 126, a center bay deck segment 128, and a pair of opposite end bay deck segments 130. Each compliant deck segment 126 extends between a corresponding pair of adjacent longitudinal beams 114. Specifically, the compliant deck segment 126a extends between corresponding longitudinal beams 114a and 114b; the compliant deck segment 126b extends between corresponding longitudinal beams 114b and 114c; the compliant deck segment 126c extends between corresponding longitudinal beams 114c and 114d; the compliant deck segment 126d extends between corresponding longitudinal beams 114e and 114f; the compliant deck segment 126e extends between corresponding longitudinal beams 114f and 114g; and the compliant deck segment 126f extends between corresponding longitudinal beams 114g and 114h. Each of the compliant deck segments 126a, 126b, 126c, 126d, 126e, and 126f may be referred to herein as a "first deck segment" and/or a "second deck segment". The center deck segment 128 may be referred to herein as a "first deck segment" and/or a "second deck segment". Each of the end bay deck segments 130a and 130b may be referred to herein as a "first deck segment" and/or a "second deck segment".

As will be described in more detail below, and referring now solely to FIG. 3, the compliant deck segment 126a is joined to the longitudinal beams 114a and 114b at respective joints 132 and 134; the compliant deck segment 126b is joined to the longitudinal beams 114b and 114c at respective joints 136 and 138; the compliant deck segment 126c is joined to the longitudinal beams 114c and 114d at respective joints 140 and 142; the compliant deck segment 126d is joined to the longitudinal beams 114e and 114f at respective joints 144 and 146; the compliant deck segment 126e is joined to the longitudinal beams 114f and 114g at respective joints 148 and 150; and the compliant deck segment 126f is joined to the longitudinal beams 114g and 114h at respective joints 152 and 154. Each compliant deck segment 126 is joined to the corresponding longitudinal beams 114 using any suitable fastener, such as, but not limited to, bolts, rivets, adhesive, epoxy, welding, brazing, and/or the like. Although six are shown, the pressure deck 116 includes any other number of compliant deck segments 126 in other implementations (e.g., the number of compliant deck segments 128 is selected based on the number of longitudinal beams 114, etc.).

Referring again to FIGS. 1 and 3, each compliant deck segment 126 of the pressure deck 116 is a deflectable spring. Specifically, each compliant deck segment 126 of the pressure deck 116 is resiliently deflectable along the pitch axis 106 of the fuselage 102. Accordingly, each compliant deck segment 126 of the pressure deck 116 is compliant along the pitch axis 106 of the fuselage 102. In the exemplary implementation, each compliant deck segment 126 of the pressure deck 116 is a catenary shaped web. However, one or more of the compliant deck segments 116 additionally or alternatively includes any type of a compliant structure such as, but not limited to, a parabolic shape, a sinusoidal shape, a radius shape, and/or the like.

Each compliant deck segment 126 of the pressure deck 116 includes (e.g., is fabricated from, consists of, etc.) any material(s) that enable the compliant deck segment 126 to be compliant along the pitch axis 106 of the fuselage 102. For example, the compliant deck segments 126 include (e.g., are fabricated from, consist of, etc.) a composite material in some implementations, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. In one example, one or more of the compliant deck segments 126 includes (e.g., is fabricated from, consists of, etc.) a thermoplastic carbon fiber composite material. In some other implementations, one or more of the compliant deck segments 126 includes (e.g., is fabricated from, consists of, etc.) another material in addition or alternative to a composite material, such as, but not limited to, titanium, aluminum, steel, an alloy of two or more metals, and/or the like.

The center bay deck segment 128 extends between a corresponding pair of adjacent longitudinal beams 114. Specifically, the center bay deck segment 128 extends between corresponding longitudinal beams 114d and 114e. The center bay deck segment 128 is joined to the longitudinal beams 114d and 114e at respective joints 158 and 160. The center bay deck segment 128 is joined to the corresponding longitudinal beams 114d and 114e using any suitable fastener, such as, but not limited to, bolts, rivets, adhesive, epoxy, welding, brazing, and/or the like. Although only a single center bay deck segment 128 is shown, the pressure deck 116 includes any other number of center bay deck segments 128 in other implementations (e.g., the number of center bay deck segments 128 is selected based on the number of longitudinal beams 114, etc.).

In the exemplary implementation, the center bay deck segment 128 is a relatively rigid structure (e.g., a stiffened structure, etc.) that extends along a generally planar (e.g., approximately straight, etc.) path between the longitudinal beams 114d and 114e. In other implementations, the center bay deck segment 128 is compliant along the pitch axis 106 of the fuselage 102 (i.e., is a resiliently deflectable along the pitch axis 106 of the fuselage 102); for example, the center bay deck segment 128 is a catenary shaped web in some other implementations. In some implementations, and for example. the center bay segment 128 includes a parabolic shape, a sinusoidal shape, a radius shape, and/or the like.

The center bay deck segment 128 of the pressure deck 116 includes (e.g., is fabricated from, consists of, etc.) any material(s) that enable the center bay deck segment 128 to function as described and/or illustrated herein. For example, the center bay deck segment 128 includes (e.g., is fabricated from, consists of, etc.) a composite material in some implementations, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. In one example, the center bay deck segment 128 includes (e.g., is fabricated from, consists of, etc.) a thermoplastic carbon fiber composite material. In some other implementations, the center bay deck segment includes (e.g., is fabricated from, consists of, etc.) another material in addition or alternative to a composite material, such as, but not limited to, titanium, aluminum, steel, an alloy of two or more metals, and/or the like.

The end bay deck segments 130 extend between a corresponding longitudinal beam 114 and a corresponding longeron 124 of the fuselage 102. Specifically, and referring now solely to FIG. 3, the end bay deck segment 130a extends between the longitudinal beam 114a and the longeron 124a, while the end bay deck segment 130b extends between the longitudinal beam 114h and the longeron 124b. The end bay deck segment 130a is joined to the longitudinal beam 114a and the longeron 124a at respective joints 162 and 164; and the end bay deck segment 130b is joined to the longitudinal beam 114h and the longeron 124b at respective joints 166 and 168. The end bay deck segments 130a and 130b are joined to the respective longitudinal beams 114a and 114h using any suitable fastener, such as, but not limited to, bolts, rivets, adhesive, epoxy, welding, brazing, and/or the like. The end bay deck segments 130a and 130b are joined to the respective longerons 124a and 124b using any suitable fastener, such as, but not limited to, bolts, rivets, adhesive, epoxy, welding, brazing, and/or the like.

Referring again to FIGS. 1 and 3, in the exemplary implementation, the end bay deck segments 130 are each relatively rigid structures (e.g., a stiffened structure, etc.) that extend along generally planar (e.g., approximately straight, etc.) paths between the corresponding longitudinal beam 114 and the corresponding longeron 124. In other implementations, one or both of the end bay deck segments 130 is compliant along the pitch axis 106 of the fuselage 102 (i.e., is a resiliently deflectable along the pitch axis 106 of the fuselage 102); for example, the end bay segment 130a and/or 130b is a catenary shaped web in some other implementations. In some implementations, and for example. the end bay segment 130a and/or 130b includes a parabolic shape, a sinusoidal shape, a radius shape, and/or the like.

Each end bay deck segment 130 of the pressure deck 116 includes (e.g., is fabricated from, consists of, etc.) any material(s) that enable the end bay deck segment 130 to function as described and/or illustrated herein. For example, one or both of the end bay deck segments 130 includes (e.g., is fabricated from, consists of, etc.) a composite material in some implementations, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. In one example, each of the end bay deck segments 130 includes (e.g., is fabricated from, consists of, etc.) a thermoplastic carbon fiber composite material. In some other implementations, one or both of the end bay deck segments 130 includes (e.g., is fabricated from, consists of, etc.)

another material in addition or alternative to a composite material, such as, but not limited to, titanium, aluminum, steel, an alloy of two or more metals, and/or the like.

Figure 4:
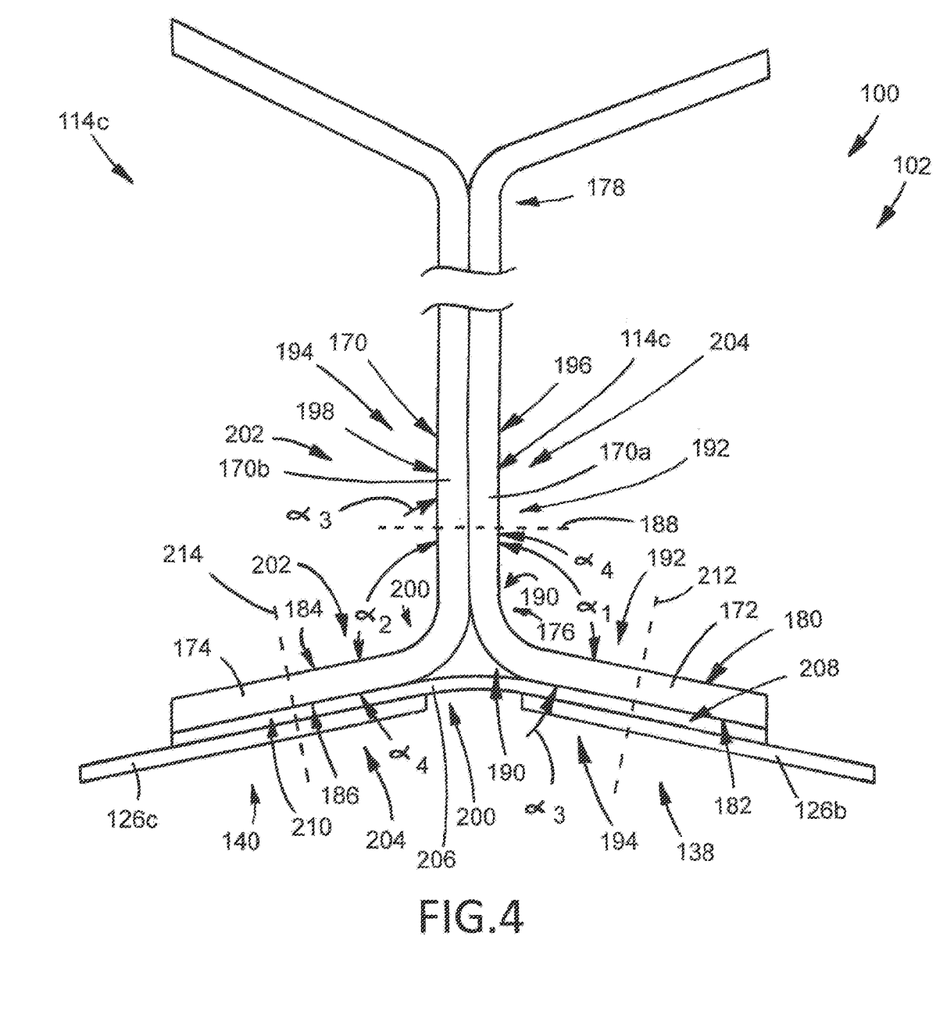
FIG. 4 is a cross-sectional view of a portion of the pressure deck assembly segment shown in FIG. 1 illustrating joints between a pressure deck and a longitudinal beam of the pressure deck assembly according to an implementation.

FIG. 4 illustrates the joints 138 and 140 between the compliant deck segments 126b and 126c, respectively, and the longitudinal beam 114c according to an implementation. The construction of the joints 134, 142, 146, 150, and 154 (shown in FIG. 3) is substantially similar to the joint 138; and the construction of the joints 132, 136, 144, 148, and 152 (shown in FIG. 3) is substantially similar to the joint 140. Accordingly, the joints 132, 134, 136, 142, 144, 146, 148, 150, 152, and 154 will not be described in more detail herein, but it should be understood that the performance, load paths, benefits, advantages, and/or like of the construction of the joints 138 and 140 is equally applicable to the joints 132, 134, 136, 142, 144, 146, 148, 150, 152, and 154. Moreover, in some implementations, the joints 160, 162, and/or 168 (shown in FIG. 3) have a substantially similar construction as the joint 138 and/or the joints 158, 164, and/or 166 (shown in FIG. 3) have a substantially similar construction as the joint 140 such that the performance, load paths, benefits, advantages, and/or like of the construction of the joints 138 and 140 is equally applicable to the joints 160, 162, 168, 158, 164, and/or 166, respectively.

As shown in FIG. 4, the longitudinal beam 114c includes a central member 170 and opposing flanges 172 and 174 that extend from the central member 170. The central member 170 extends a height from a first end portion 176 to an opposite second end portion 178. The flanges 172 and 174 extend outward from the first end portion 176 of the central member 170. The flange 172 includes an upper side 180 and an opposite lower side 182; and the flange 174 includes an upper side 184 and an opposite lower side 186. As can be seen in FIG. 4, each of the upper sides 180 and 184 faces generally toward the second end portion 178 of the central member 170, while each of the lower sides 182 and 186 faces generally away from the second end portion 178 of the central member 170. Each of the flanges 172 and 174 may be referred to herein as a "first" and/or a "second" flange. Each of the upper sides 180 and 184 may be referred to herein as a "first" and/or a "second" upper side, while each of the lower sides 182 and 186 may be referred to herein as a "first" and/or a "second" lower side.

Optionally, the central member 170 of the longitudinal beam 114c has a two or more-piece construction. For example, the central member 170 of the exemplary implementation of the longitudinal beam 114c shown in FIG. 4 includes two member segments 170a and 170b that are joined together along the length of the longitudinal beam 114c using any suitable fastener, such as, but not limited to, bolts, rivets, adhesive, epoxy, welding, brazing, and/or the like. The flange 172 extends from the member segment 170a of the central member 170, while the flange 174 extends from the member segment 170b of the central member 170. In the example of FIG. 4, a central axis 188 of an exemplary fastener (not shown) such as a bolt or a rivet is shown to indicate that the member segments 170a and 170b are joined together. It should be understood that the location of the central axis 188 of the fastener along the height of the central member 170 is meant as exemplary only. The central axis 188 of the fastener additionally or alternatively may have any other location along the height of the central member 170. In other implementations, the central member 170 of the longitudinal beam 114c is defined by a single member segment such that the central member 170 has a one-piece construction. Each of the member segments 170a and 170b of the central member 170 may be referred to herein as a "first" member segment and/or a "second" member segment.

As shown in FIG. 4, the flange 172 of the longitudinal beam 114c extends from the central member 170 at an angle $\alpha_1$ relative to the central member 170 such that the flange 172 and the central member 170 form an L-shape. Similarly, the flange 174 of the longitudinal beam 114c extends from the central member 170 at an angle $\alpha_2$ relative to the central member 170 such that the flange 174 and the central member 170 form an L-shape. In the exemplary implementation, the angles $\alpha_1$ and $\alpha_2$ are approximately equal and are oblique angles greater than 90°. But, in other implementations the L-shape defined by the flange 172 and the central member 170 has any other angle $\alpha_1$ that is less than approximately 180° (e.g., an angle $\alpha_1$ of approximately 90°, an oblique angle $\alpha_1$ that is less than approximately 90°, a different oblique angle $\alpha_1$ that is greater than approximately 90°, etc.). Moreover, the L-shape defined by the flange 174 and the central member 170 has any other angle $\alpha_2$ that is less than approximately 180° (e.g., an angle $\alpha_2$ of approximately 90°, an oblique angle $\alpha_2$ that is less than approximately 90°, a different oblique angle $\alpha_1$ that is greater than approximately 90°, etc.) in some other implementations. In some other implementations, the L-shapes defined by the central member 170 and the flanges 172 and 174 have respective angles $\alpha_1$ and $\alpha_2$ that have different values.

As is also shown in FIG. 4, the flange 172 of the longitudinal beam 114c extends from the central member 170 such that the flange 172 forms a corner 190 of the longitudinal beam 114c with the central member 170. The corner 190 includes an inside 192 that is defined by a volume of space that extends within the angle $\alpha_1$ between the central member 170 and the flange 172. The corner 190 includes an outside 194 that is defined by another volume of space that extends within an angle $\alpha_3$ between the central member 170 and the flange 172. As can be seen in FIG. 4, the upper side 180 of the flange 172 defines a portion of the inside 192 of the corner 190, while a side 196 of the central member 170 defines another portion of the inside 192 of the corner 190. A side 198 of the central member 170 that is opposite the side 196 defines a portion of the outside 194 of the corner 190, while the lower side 182 of the flange 172 defines another portion of the outside 194 of the corner 190. The corner 190 may be referred to herein as a "first" and/or a "second" corner.

The flange 174 of the longitudinal beam 114c extends from the central member 170 such that the flange 174 forms a corner 200 of the longitudinal beam 114c with the central member 170. The corner 200 includes an inside 202 that is defined by a volume of space that extends within the angle $\alpha_2$ between the central member 170 and the flange 174. As can be seen in FIG. 4, the upper side 184 of the flange 174 defines a portion of the inside 202 of the corner 200, while the side 198 of the central member 170 defines another portion of the inside 202 of the corner 200. The corner 200 includes an outside 204 that is defined by another volume of space that extends within an angle $\alpha_4$ between the central member 170 and the flange 174. The lower side 186 of the flange 174 defines a portion of the outside 204 of the corner 200, while the side 196 of the central member 170 defines another portion of the outside 204 of the corner 200. The corner 200 may be referred to herein as a "first" and/or a "second" corner.

The compliant deck segment 126b of the pressure deck 116 is joined to the flange 172 of the longitudinal beam 114c along the lower side 182 of the flange 172. Accordingly, the compliant deck segment 126b is joined to the flange 172 of the longitudinal beam 114c such that the compliant deck segment 126b extends on the outside 194 of the corner 190 of the longitudinal beam 114c. Similarly, the compliant deck segment 126c of the pressure deck 116 is joined to the flange 174 of the longitudinal beam 114c along the lower side 186 of the flange 174. The compliant deck segment 126c is thus joined to the flange 174 of the longitudinal beam 114c such that the compliant deck segment 126c extends on the outside 204 of the corner 200 of the longitudinal beam 114c.

In the exemplary implementation, the joints 138 and 140 between the longitudinal beam 114c and the compliant deck segments 126b and 126c, respectively, include a splice 206. Specifically, the splice 206 extends a length from an end portion 208 to an opposite end portion 210. As shown in FIG. 4, the end portion 208 of the splice 206 is joined between the flange 172 of the longitudinal beam 114c and the compliant deck segment 126b of the pressure deck 116. The end portion 210 of the splice 206 is joined between the flange 174 of the longitudinal beam 114c and the compliant deck segment 126c of the pressure deck 116, as is also shown in FIG. 4. Each of the end portions 208 and 210 of the splice 206 may be referred to herein as a "first" end portion and/or a "second" end portion.

The splice 206 strengthens the joinder (e.g., the connection, the attachment, etc.) between the member segments 170a and 170b of the central member 170 of the longitudinal beam 114c, for example to prevent the member segments 170a and 170b from separating, etc. The splice 206 may also facilitate providing a predetermined distance D (described below with respect to FIG. 5). In other implementations, the joint 138 and/or 140 does not include the splice 206 and the respective compliant deck segment 126b and/or 126c is joined directly to the respective lower side 182 and/or 186 of the respective flange 172 and/or 174. For example, the splice 206 may not be included in some implementations wherein the central member 170 of the longitudinal beam 114c is defined by a single member segment (i.e., the central member 170 has a one-piece construction).

The splice 206 includes (e.g., is fabricated from, consists of, etc.) any material(s) that enable the splice 206 to function as described and/or illustrated herein. For example, the splice 206 includes (e.g., is fabricated from, consists of, etc.) a composite material in some implementations, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. In one example, the splice 206 includes (e.g., is fabricated from, consists of, etc.) a thermoplastic carbon fiber composite material. In some other implementations, the splice 206 includes (e.g., is fabricated from, consists of, etc.) another material in addition or alternative to a composite material, such as, but not limited to, titanium, aluminum, steel, an alloy of two or more metals, and/or the like.

As discussed above, the compliant deck segments 126b and 126c are joined to the longitudinal beam 114c using any suitable fastener, such as, but not limited to, bolts, rivets, adhesive, epoxy, welding, brazing, and/or the like. Specifically, the compliant deck segments 126b and 126 are joined to the respective flanges 172 and 174, whether directly or with the splice 206 therebetween, using any suitable fastener, such as, but not limited to, bolts, rivets, adhesive, epoxy, welding, brazing, and/or the like. In the example of FIG. 4, central axes 212 and 214 of exemplary fasteners (not shown) such as a bolt and/or a rivet are shown to indicate that the compliant deck segments 126b and 126c are joined to the respective flanges 172 and 174 with the splice 206 joined therebetween. The location of the central axes 212 and 214 of the fasteners along the length of the flanges 172 and 174, respectively, is meant as exemplary only. The central axes 212 and/or 214 additionally or alternatively may have any other location along the length of the respective flange 172 and/or 174. In some implementations, the fasteners that join the compliant deck segment 126b to the longitudinal beam 114c are staggered along the length (shown in FIG. 1) of the longitudinal beam 114c relative to the fasteners that join the compliant deck segment 126c to the longitudinal beam 114c.

Figure 5:
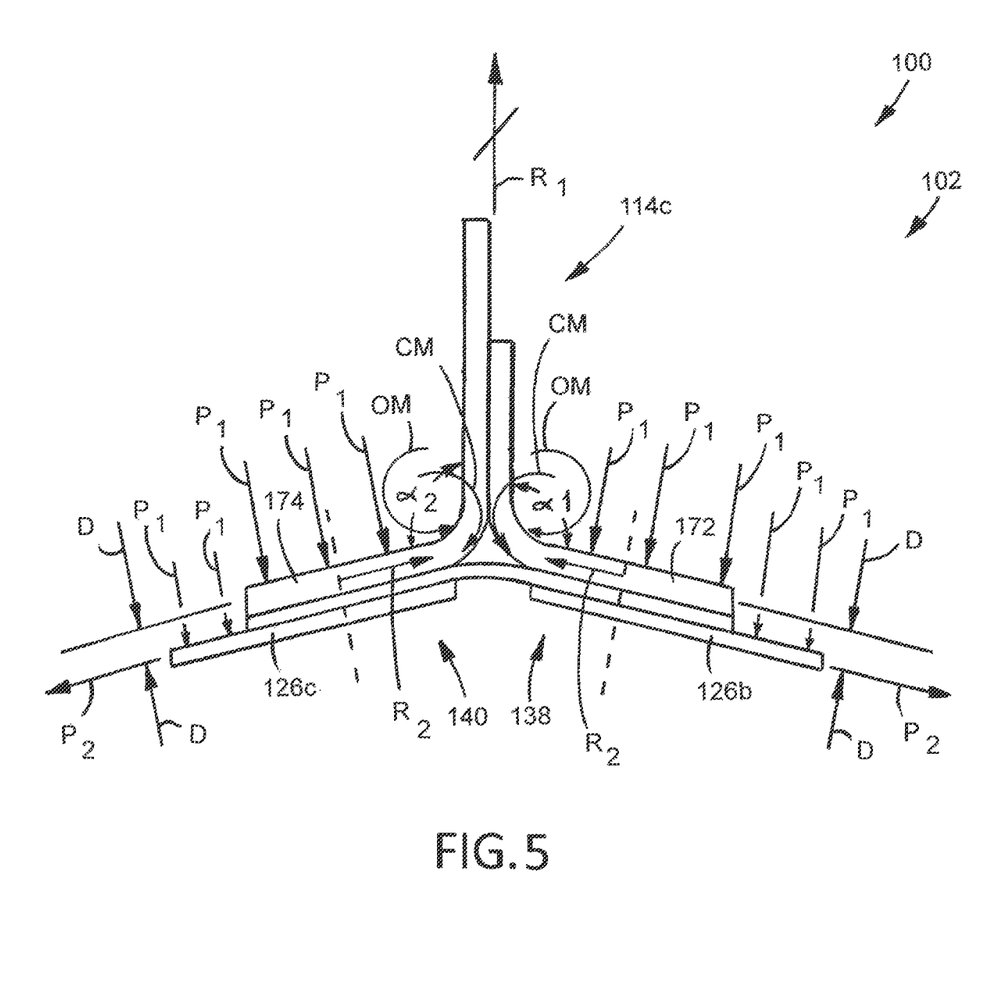
FIG. 5 is a cross-sectional view illustrating load paths through the joints shown in FIG. 4 according to an implementation.

Referring now to FIG. 5, the load paths through the joints 138 and 140 will now be described. When an interior compartment of the fuselage 102 is pressurized, the pressure exerts a pressure load $P_1$ on the flanges 172 and 174 and on the compliant deck segments 126b and 126c. The pressure load $P_1$ results in a reaction force $R_1$ along the height of the central member 170 of the longitudinal beam 114c. The pressure load $P_1$ also results in: (1) a tension load $P_2$ within the compliant deck segments 126b and 126c; and (2) an opening moment OM (i.e., a torque) that acts to open (i.e., increase) the angles $\alpha_1$ and $\alpha_2$. The opening moment OM generated (i.e., causes) inter-laminar tension (ILT) within the longitudinal beam 114c.

The tension load $P_2$ within the compliant deck segments 126b and 126c results in a reaction force $R_2$ within the flanges 172 and 174, respectively. Specifically, the reaction force $R_2$ is generated from the tension load $P_2$ reacting through the fasteners that join the compliant deck segments 126b and 126c to the respective flanges 172 and 174. As shown in FIG. 5, the reaction force $R_2$ is separated from the tension load $P_2$ by the predetermined distance D. The predetermined distance D between the tension load $P_2$ in the compliant deck segments 126b and 126c and the reaction force $R_2$ in the flanges 172 and 174 generates a closing moment CM (e.g., a torque, etc.) that acts to close (i.e., decrease) the angles $\alpha_1$ and $\alpha_2$. The closing moment CM acts in a direction that is opposite the opening moment OM such that the closing moment CM counteracts the opening moment OM. For example, in some implementations the closing moment CM reduces the effects of the opening moment OM on the longitudinal beam 114c and thereby reduces the ILT generated within the longitudinal beam 114c. In other implementations, and for example, the closing moment CM is approximately equal to the opening moment OM such that the closing moment CM approximately cancels out the opening moment OM (and thereby approximately eliminates the ILT generated within the longitudinal beam 114c from the OM). The predetermined distance D between the tension load $P_2$ and the reaction force $R_2$ may be selected to provide a closing moment CM having any magnitude and/or to reduce the effects of the OM by any amount, for example by selecting the thickness of the splice 206, selecting whether to include the splice 206, selecting the thickness of the flanges 172 and/or 174, and/or the like.

By reducing or eliminating the ILT generated within the longitudinal beam 114c, the construction of the joints 138 and 140 shown in FIG. 5 enables the longitudinal beams 114 to include (e.g., be fabricated from, consist of, etc.) materials that have lower ILT capabilities. For example, the construction of the joints 138 and 140 shown in FIG. 5 may enable the longitudinal beams 114 to include (e.g., be fabricated from, consist of, etc.) composite materials, such as, but not limited to, a carbon composite material, a carbon fiber composite material, a thermoplastic composite material, a thermoplastic carbon fiber composite material, a thermoset composite material, a thermoset carbon fiber composite material, a poly-paraphenylene terephthalamide fiber composite material, and/or the like. Using composite materials to construct the longitudinal beams 114 may reduce the weight of the pressure deck assembly 100, which may enable improvement of the operational performance, efficiency, and/or capabilities of an aircraft.

Referring now to FIG. 6, some examples of the disclosure are described in the context of an aircraft 300 that includes an airframe 304 having a fuselage 302. The fuselage 302 includes an interior compartment 306. The airframe 304 includes a plurality of high-level systems 308. Examples of high-level systems 308 include one or more of a propulsion system 310, an electrical system 312, a hydraulic fluid system 314, a control system 316, and an environmental system 318. Any number of other systems can be included. Although an aerospace example is shown, the principles can be applied to other industries, such as, but not limited to, the automotive industry, the marine industry, and/or the like.

Figure 7:
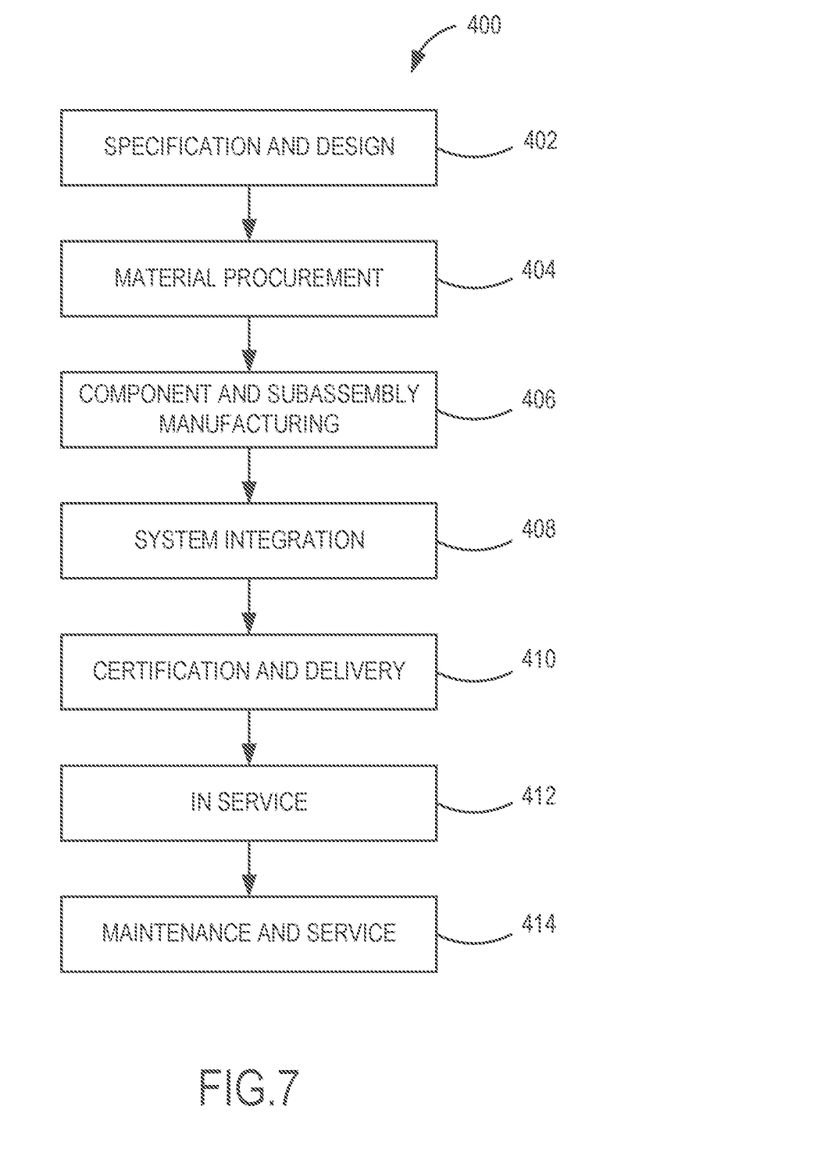
FIG. 7 is a block diagram of an implementation of an aircraft production and service methodology.

Examples of the disclosure can be described in the context of an aircraft manufacturing and service method 400 as shown in FIG. 7. During pre-production, illustrative method 400 can include specification and design 402 of an aircraft (e.g., the aircraft 300 shown in FIG. 6, etc.) and material procurement 404. During production, component and subassembly manufacturing 406 and system integration 408 of the aircraft take place. Thereafter, the aircraft can go through certification and delivery 410 to be placed in service 412. While in service by a customer, the aircraft is scheduled for routine maintenance and service 414 (which can also include modification, reconfiguration, refurbishment, and so on).

Each of the processes of the illustrative method 400 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, and/or the like.

Systems and methods shown or described herein can be employed during any one or more of the stages of the manufacturing and service method 400. For example, components or subassemblies corresponding to component and subassembly manufacturing 406 can be fabricated or manufactured in a manner similar to components or subassemblies produced while the aircraft is in service. Also, one or more aspects of the system, method, or combination thereof can be utilized during the production states of subassembly manufacturing 406 and system integration 408, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 414.

Various implementations of the present disclosure enable longitudinal beams of a pressure deck assembly to be fabricated from composite materials. Certain implementations of the present disclosure reduce the weight of a pressure deck assembly of an aircraft fuselage. Certain implementations of the present disclosure increase the operational performance, efficiency, and/or capabilities of an aircraft.

The following clauses describe further aspects:

Clause Set A:

A1. A pressure deck assembly for a fuselage, the pressure deck assembly comprising:

a longitudinal beam extending a length along a roll axis of the fuselage, the longitudinal beam comprising a central member and opposing first and second flanges extending from the central member, the first flange comprising a first upper side and a first lower side, the second flange comprising a second upper side and a second lower side, a pressure deck comprising first and second deck segments, wherein the first deck segment is joined to the first flange of the longitudinal beam along the first lower side of the first flange, and wherein the second deck segment is joined to the second flange of the longitudinal beam along the second lower side of the second flange.

A2. The pressure deck assembly of clause A1, wherein the longitudinal beam comprises at least one of a composite material, a carbon fiber composite material, a thermoplastic composite material, a thermoplastic carbon fiber composite material, a thermoset composite material, or a thermoset carbon fiber composite material.

A3. The pressure deck assembly of clause A1, further comprising a splice extending a length from a first end portion to a second end portion, the first end portion of the splice being joined between the first flange of the longitudinal beam and the first deck segment of the pressure deck, the second end portion of the splice being joined between the second flange of the longitudinal beam and the second deck segment of the pressure deck.

A4. The pressure deck assembly of clause A1, wherein the central member of the longitudinal beam extends a height from a first end portion to a second end portion, the first and second flanges extending outward from the first end portion, wherein the first and second lower sides of the first and second flanges, respectively, face away from the second end portion of the central member.

A5. The pressure deck assembly of clause A1, wherein the first flange of the longitudinal beam extends from the central member such that the first flange and the central member form an L-shape, and wherein the second flange of the longitudinal beam extends from the central member such that the second flange and central member form an L-shape.

A6. The pressure deck assembly of clause A1, wherein at least one of the first deck segment or the second deck segment of the pressure deck is compliant along a pitch axis of the fuselage.

A7. The pressure deck assembly of clause A1, wherein at least one of the first deck segment or the second deck segment of the pressure deck comprises a catenary shaped web.

A8. The pressure deck assembly of clause A1, wherein at least one of the first flange or the second flange is separated from the respective first or second deck segments by a predetermined distance that is configured to generate at least one closing moment that acts to close an angle between the central member and at least one of the first flange or the second flange under pressure loading.

A9. The pressure deck assembly of clause A1, wherein the central member of the longitudinal beam comprises first and second member segments joined together, the first flange extending from the first member segment, the second flange extending from the second member segment.

Clause Set B:

B1. A pressure deck assembly for a fuselage, the pressure deck assembly comprising:

a longitudinal beam extending a length along a roll axis of the fuselage, the longitudinal beam comprising a central member and opposing first and second flanges extending from the central member, the first flange forming a first corner of the longitudinal beam with central member, the second flange forming a second corner of the longitudinal beam with the central member; and a pressure deck comprising first and second deck segments, wherein the first deck segment is joined to the first flange of the longitudinal beam such that the first deck segment extends on an outside of the first corner of the longitudinal beam, and wherein the second deck segment is joined to the second flange of the longitudinal beam such that the second deck segment extends on an outside of the second corner of the longitudinal beam.

B2. The pressure deck assembly of clause B1, wherein the longitudinal beam comprises at least one of a composite material, a carbon fiber composite material, a thermoplastic composite material, a thermoplastic carbon fiber composite material, a thermoset composite material, or a thermoset carbon fiber composite material.

B3. The pressure deck assembly of clause B, further comprising a splice extending a length from a first end portion to a second end portion, the first end portion of the splice being joined between the first flange of the longitudinal beam and the first deck segment of the pressure deck, the second end portion of the splice being joined between the second flange of the longitudinal beam and the second deck segment of the pressure deck.

B4. The pressure deck assembly of clause B1, wherein the first and second flanges of the longitudinal beam comprise respective first and second upper sides and respective first and second lower sides, the first lower side of the first flange defining a portion of the outside of the first corner, the first deck segment of the pressure deck being joined to the first flange along the first lower side of the first flange, the second lower side of the second flange defining a portion of the outside of the second corner, the second deck segment of the pressure deck being joined to the second flange along the second lower side of the second flange.

B5. The pressure deck assembly of clause B1, wherein at least one of the first deck segment or the second deck segment of the pressure deck comprises a catenary shaped web.

B6. The pressure deck assembly of clause B1, wherein at least one of the first flange or the second flange is separated from the respective first or second deck segment by a predetermined distance that is configured to generate at least one closing moment that acts to close an angle between the central member and at least one of the first flange or the second flange under pressure loading.

Clause Set C:

C1. A fuselage for an aircraft, the fuselage comprising:
a pressure deck assembly comprising:
a longitudinal beam extending a length along a roll axis of the fuselage, the longitudinal beam comprising a central member and a flange extending from the central member, the flange comprising an upper side and a lower side; and
a pressure deck comprising a deck segment, wherein the deck segment is joined to the flange of the longitudinal beam along the lower side of the flange.

C2. The fuselage of clause C1, wherein the longitudinal beam comprises at least one of a composite material, a carbon fiber composite material, a thermoplastic composite material, a thermoplastic carbon fiber composite material, a thermoset composite material, or a thermoset carbon fiber composite material.

C3. The fuselage of clause C1, wherein the central member of the longitudinal beam extends a height from a first end portion to a second end portion, the flange extending outward from the first end portion, wherein the lower side of the flanges faces away from the second end portion of the central member.

C4. The fuselage of clause C1, wherein the deck segment of the pressure deck comprises a catenary shaped web.

C5. The fuselage of clause C1, wherein the flange and the deck segment are separated by a predetermined distance that is configured to generate a closing moment that acts to close an angle between the central member and the flange under pressure loading of the flange.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A pressure deck assembly for a fuselage, the pressure deck assembly comprising:
   a longitudinal beam extending a length along a roll axis of the fuselage, the longitudinal beam comprising a central member and opposing first and second flanges extending from the central member, the first flange comprising a first upper side and a first lower side, the second flange comprising a second upper side and a second lower side,
   a pressure deck comprising first and second deck segments, wherein the first deck segment is joined to the first flange of the longitudinal beam along the first lower side of the first flange, and wherein the second deck segment is joined to the second flange of the longitudinal beam along the second lower side of the second flange.

2. The pressure deck assembly of claim 1, further comprising a second longitudinal beam extending the length along the roll axis of the fuselage, the second longitudinal beam comprising a second central member and opposing third and fourth flanges extending from the second central member, the third flange comprising a third upper side and a third lower side, the fourth flange comprising a fourth upper side and a fourth lower side, wherein the first deck segment is joined to the fourth flange of the second longitudinal beam along the fourth lower side of the fourth flange.

3. The pressure deck assembly of claim 1, further comprising a splice extending a length from a first end portion to a second end portion, the first end portion of the splice being joined between the first flange of the longitudinal beam and the first deck segment of the pressure deck, the second end portion of the splice being joined between the second flange of the longitudinal beam and the second deck segment of the pressure deck.

4. The pressure deck assembly of claim 1, wherein the central member of the longitudinal beam extends a height from a first end portion to a second end portion, the first and second flanges extending outward from the first end portion, wherein the first and second lower sides of the first and second flanges, respectively, face away from the second end portion of the central member.

5. The pressure deck assembly of claim 1, wherein the first flange of the longitudinal beam extends from the central member such that the first flange and the central member form an L-shape, and wherein the second flange of the longitudinal beam extends from the central member such that the second flange and central member form an L-shape.

6. The pressure deck assembly of claim 1, wherein a width of the pressure deck extends laterally across a width of the fuselage along a pitch axis.

7. The pressure deck assembly of claim 1, wherein at least one of the first deck segment or the second deck segment of the pressure deck comprises a catenary shaped web.

8. The pressure deck assembly of claim 1, wherein at least one of the first flange or the second flange is separated from the respective first or second deck segment by a predetermined distance that is configured to generate at least one closing moment that acts to close an angle between the central member and at least one of the first flange or the second flange under pressure loading.

9. The pressure deck assembly of claim 1, wherein the central member of the longitudinal beam comprises first and second member segments joined together, the first flange extending from the first member segment, the second flange extending from the second member segment.

10. A pressure deck assembly for a fuselage, the pressure deck assembly comprising:
    a longitudinal beam extending a length along a roll axis of the fuselage, the longitudinal beam comprising a central member and opposing first and second flanges extending from the central member, the first flange forming a first corner of the longitudinal beam with central member, the second flange forming a second corner of the longitudinal beam with the central member; and
    a pressure deck comprising first and second deck segments, wherein the first deck segment is joined to the first flange of the longitudinal beam such that the first deck segment extends on an outside of the first corner of the longitudinal beam, and wherein the second deck segment is joined to the second flange of the longitudinal beam such that the second deck segment extends on an outside of the second corner of the longitudinal beam.

11. The pressure deck assembly of claim 10, wherein the longitudinal beam comprises at least one of a composite material, a carbon fiber composite material, a thermoplastic composite material, a thermoplastic carbon fiber composite material, a thermoset composite material, or a thermoset carbon fiber composite material.

12. The pressure deck assembly of claim 10, further comprising a splice extending a length from a first end portion to a second end portion, the first end portion of the splice being joined between the first flange of the longitudinal beam and the first deck segment of the pressure deck, the second end portion of the splice being joined between the second flange of the longitudinal beam and the second deck segment of the pressure deck.

13. The pressure deck assembly of claim 10, wherein the first and second flanges of the longitudinal beam comprise respective first and second upper sides and respective first and second lower sides, the first lower side of the first flange defining a portion of the outside of the first corner, the first deck segment of the pressure deck being joined to the first flange along the first lower side of the first flange, the second lower side of the second flange defining a portion of the outside of the second corner, the second deck segment of the pressure deck being joined to the second flange along the second lower side of the second flange.

14. The pressure deck assembly of claim 10, wherein at least one of the first deck segment or the second deck segment of the pressure deck comprises a catenary shaped web.

15. The pressure deck assembly of claim 10, wherein at least one of the first flange or the second flange is separated from the respective first or second deck segment by a predetermined distance that is configured to generate at least one closing moment that acts to close an angle between the central member and at least one of the first flange or the second flange under pressure loading.

16. A fuselage for an aircraft, the fuselage comprising:
a pressure deck assembly comprising:
a longitudinal beam extending a length along a roll axis of the fuselage, the longitudinal beam comprising a central member and a flange extending from the central member, the flange comprising an upper side and a lower side; and
a pressure deck comprising a deck segment, wherein a width of the pressure deck extends laterally across a width of the fuselage along a pitch axis, and wherein the deck segment is joined to the flange of the longitudinal beam along the lower side of the flange.

17. The fuselage of claim 16, wherein the longitudinal beam comprises at least one of a composite material, a carbon fiber composite material, a thermoplastic composite material, a thermoplastic carbon fiber composite material, a thermoset composite material, or a thermoset carbon fiber composite material.

18. The fuselage of claim 16, wherein the central member of the longitudinal beam extends a height from a first end portion to a second end portion, the flange extending outward from the first end portion, wherein the lower side of the flanges faces away from the second end portion of the central member.

19. The fuselage of claim 16, further comprising a splice extending a length from a first end portion to a second end portion, the first end portion of the splice being joined between the flange of the longitudinal beam and the deck segment of the pressure deck, the second end portion of the splice being joined to a second deck segment of the pressure deck.

20. The fuselage of claim 16, wherein the flange and the deck segment are separated by a predetermined distance that is configured to generate a closing moment that acts to close an angle between the central member and the flange under pressure loading of the flange.

* * * * *